United States Patent [19]

Figge

[11] 4,343,297

[45] Aug. 10, 1982

[54] SOLAR ENERGY COLLECTOR

[76] Inventor: Irving E. Figge, 11209 Susan Dr., Sandy, Utah 84070

[21] Appl. No.: 146,434

[22] Filed: May 5, 1980

Related U.S. Application Data

[63] Continuation-in-part of Ser. No. 45,918, Aug. 17, 1979, abandoned.

[51] Int. Cl.³ ................................................. F24J 3/02
[52] U.S. Cl. ................................... 126/449; 126/429; 126/445
[58] Field of Search ............................... 126/428–432, 126/449, 445, 450, 434

[56] References Cited

U.S. PATENT DOCUMENTS

| | | | |
|---|---|---|---|
| 4,007,728 | 2/1977 | Guba | 126/449 |
| 4,076,015 | 2/1978 | Mattson | 126/449 |
| 4,077,393 | 3/1978 | Mattson | 126/449 |
| 4,078,548 | 3/1978 | Kapany | 126/449 |
| 4,084,573 | 4/1978 | Shubert | 126/429 |
| 4,106,479 | 8/1978 | Rogers | 126/449 |
| 4,111,186 | 9/1978 | Ross | 126/449 |
| 4,121,565 | 10/1978 | Grisbrook | 126/449 |
| 4,126,270 | 11/1978 | Hummel | 126/428 |
| 4,141,338 | 2/1979 | Lof | 126/449 |
| 4,178,911 | 12/1979 | Mattson | 126/449 |
| 4,204,521 | 5/1980 | Mattson | 126/446 |
| 4,210,128 | 7/1980 | Mattson | 126/444 |
| 4,239,032 | 12/1980 | Irving | 126/450 |

FOREIGN PATENT DOCUMENTS

| | | | |
|---|---|---|---|
| 2282092 | 3/1976 | France | 126/449 |
| 55-46375 | 4/1980 | Japan | 126/449 |

OTHER PUBLICATIONS

"Alternative Source of Energy", Feb., 1974, No. 13, p. 51.

Primary Examiner—James C. Yeung
Attorney, Agent, or Firm—Fidelman, Wolffe & Waldron

[57] ABSTRACT

A solar energy collector has, as its basic component, a molded multipocketed collector panel, the pockets of which are modified polyhedral shapes, to increase exposed surface and heat transfer areas. This panel, having various polyhedral pockets in combination with glazing and a back cover, provides an overall, structurally sound collector which may have degrees of curvature ranging from flat to compound to spherical. A through-window ventilation receptacle may be used to support the collector, and may also serve as a plenum, if desired, to facilitate intake and distribution of room air.

4 Claims, 6 Drawing Figures

SOLAR ENERGY COLLECTOR

This application is a continuation-in-part of pending application U.S. Ser. No. 45,918, filed Aug. 17, 1979, abandoned.

BACKGROUND OF THE INVENTION

The basic constituents of any solar energy collector include a collector element, glazing, and an enclosure frame (preferably insulated), to support the glazing and the collector element. The ability of a solar collector to collect solar energy is a function of the collector element surface area and the orientation of the collector surfaces relative to the incident angles of the sun. The ability of a solar collector to transfer the collected energy to the desired media (air, liquid, etc.) is a function of the collector element surface area and the distance the media travels over the collector element. Heat losses are a function of the type and number of glazing utilized and the insulation capacity of the frame enclosure. Cost effectiveness of the collector is a function of the effective use of low cost materials and designs which lend themselves to automated mass production. Numerous solar collector designs have evolved over the years. However, none of these designs have attempted to optimize all of the above mentioned parameters in a single solar energy collector concept.

Accordingly, it is an object of this invention to optimize all of the above mentioned parameters in a single solar energy collector. The concept of a structural core as in U.S. Pat. No. 3,645,833 (filed May 20, 1970 and issued Feb. 29, 1972) gave direction of the structural core of U.S. application Ser. No. 45,918 (filed Aug. 17, 1979) which in turn, evolved into the invention of the instant application.

The instant invention comprises a solar energy collector employing a unique collector panel which, besides serving as an efficient solar collector, also serves as: the basic structural member of the collector providing inherent structural integrity; the frame for single or multiple glazing; a portion of the integral ductwork for the transfer media.

The energy collector panel comprises a plurality of collector pockets in the form of concave, tapered, truncated, three dimensional polyhedra. These pockets of three dimensional polyhedra provide numerous exposed surfaces which are oriented at various angles relative to the path and azimuth of the sun as it sweeps its arc across the sky. Thus, there are always some surfaces favorably inclined relative to the rays of the sun. The relative positioning of the pockets is such that, as one internal surface of a polyhedra begins to become shaded, a neighboring surface begins to receive sunlight. Due to this structure, positioning of the collector relative to the sun is not critical. It is also contemplated that each pocket may be in the form of a cone or truncated cone.

The solar energy collector panel can be made from any of the moldable materials including, but not limited to, plastics, metals, wood products, and composites. The pockets of the panel may be identical in size and shape or may be any combination of various sizes and shapes of polyhedra. By incorporating regularly or irregularly placed polyhedral pockets of various sizes and/or shapes into the collector, different degrees of curvature may be accomplished. This curvature may range from flat to compound to spherical, and the geometry necessary to produce the desired curvature can be determined analytically. This collector structure provides increased compressive strengths and increased flexure stiffness.

Structural efficiency is derived from joining the bases of the polyhedral pockets of greatest depth to a (preferably insulated) back cover to produce a sandwich structure in which the pocketed collector panel serves as an integral core, as well as a partial face sheet. By design, the collector panel also serves as the collector closure (sides, top, bottom) and as a frame for the glazing. The sides and top of the collector panel also are designed to present themselves to the sun's rays, thus acting as an uninsulated, unglazed collector member. The sides, top, and glazing framework are an integral part of the collector panel and can be fabricated in a single operation, thus lending to low cost, automated, mass production.

Additionally, the design and placement of the core polyhedra is such that they provide, in combination with the back member, a natural path (ductwork) for the transfer medium (air). Thus, little or no additional ductwork is required. The design of the collector is such that the flow path of the media starts at the top of the collector (between the unexposed surface of the collector and the back cover) and proceeds to and through holes in the bottom of the collector element. The medium then flows upward between the glazing and the front exposed face of the collector. Since the medium flows over both the unexposed surface and exposed surface of the pocketed collector panel, the effective heat transfer area is greater than that of a flat panel. As such, the design provides excellent heat transfer to the medium and minimizes the need for insulation.

Venting of the heated medium to the room or area to be heated is accomplished by a simple external vent housing which must include inlet and outlet ports (with or without directable louvers) attached to holes in the back cover of the collector and a circulation device (such as a fan or pump). Any material or design can be used for the vent so long as it is compatable with the inlet/outlet ports in the collector.

Since the collector panel and attached back cover provides a high degree of structural efficiency, the collector is self supporting and may be used as a mounting unit for through-window, through-wall, and the like installation.

In one preferred embodiment of the invention, each solar energy collector pocket is a minor variation of a tetrahedron, more preferably a truncated tetrahedron. It is a documented fact that a tetrahedron has the highest surface area to volume ratio of any known regular three dimensional shape. The pocketed collector panel increases the surface area presented to the sun by a factor of at least 2.5 over a flat plate panel, thus providing a highly efficient, exposed shape for solar energy collection.

DETAILED DESCRIPTION OF ONE EMBODIMENT OF THE INVENTION

Figure 1:
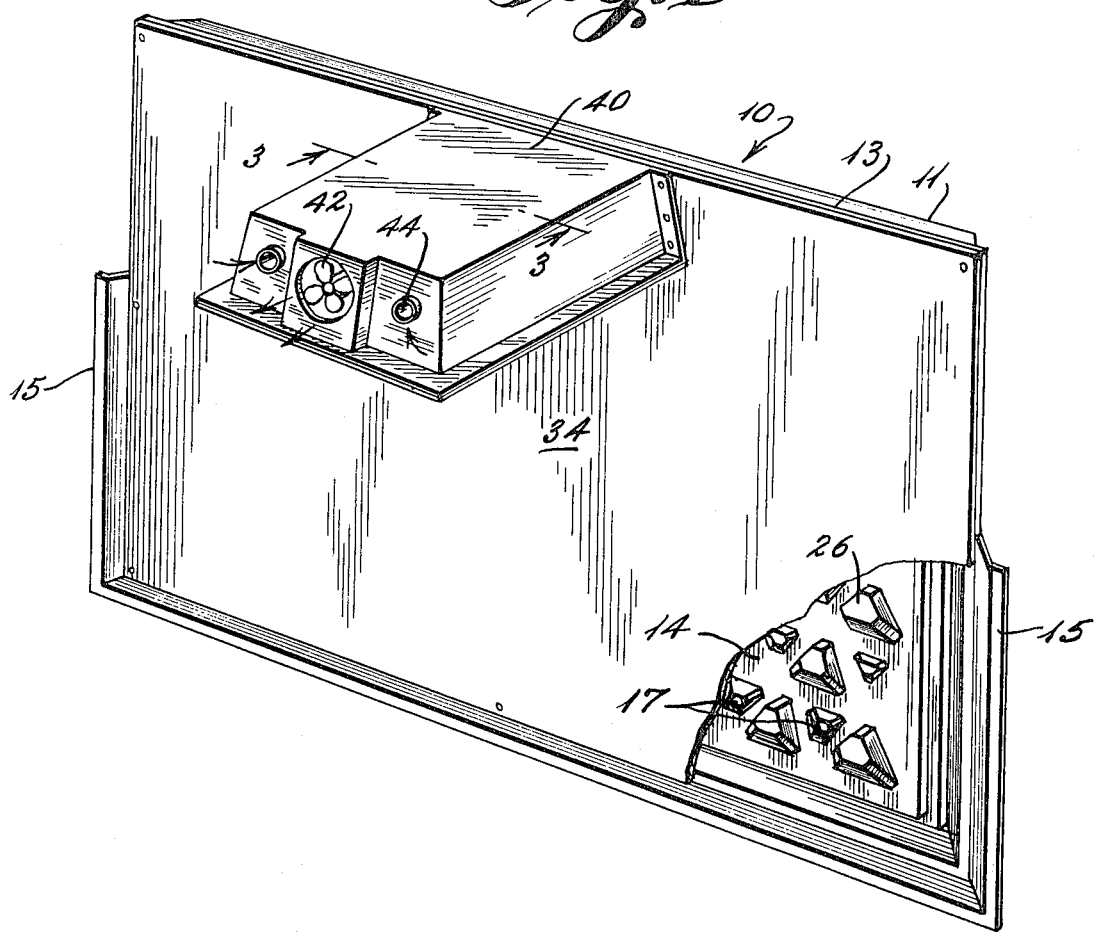
FIG. 1 is a rear isometric view of the collector with the back cover partially cut away to show the unexposed surface of the pocketed panel.
Figure 6:
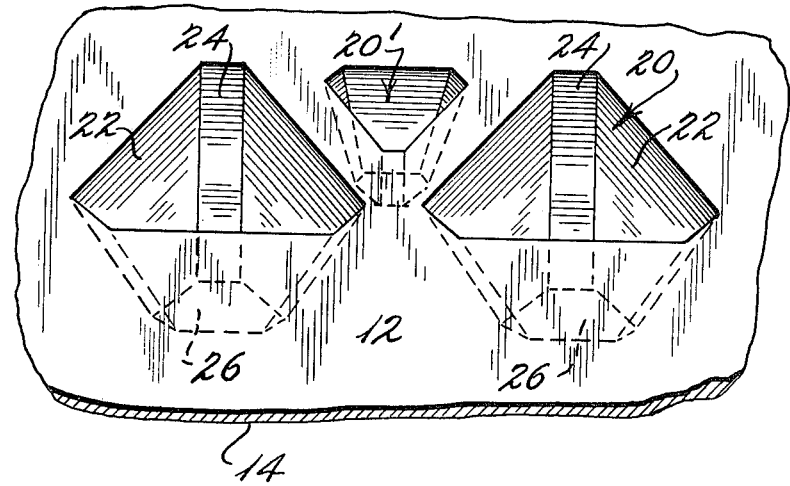
FIG. 6 is an enlarged, fragmentary view of the exposed surface of the collector panel, showing several of the pockets.
Figure 2:
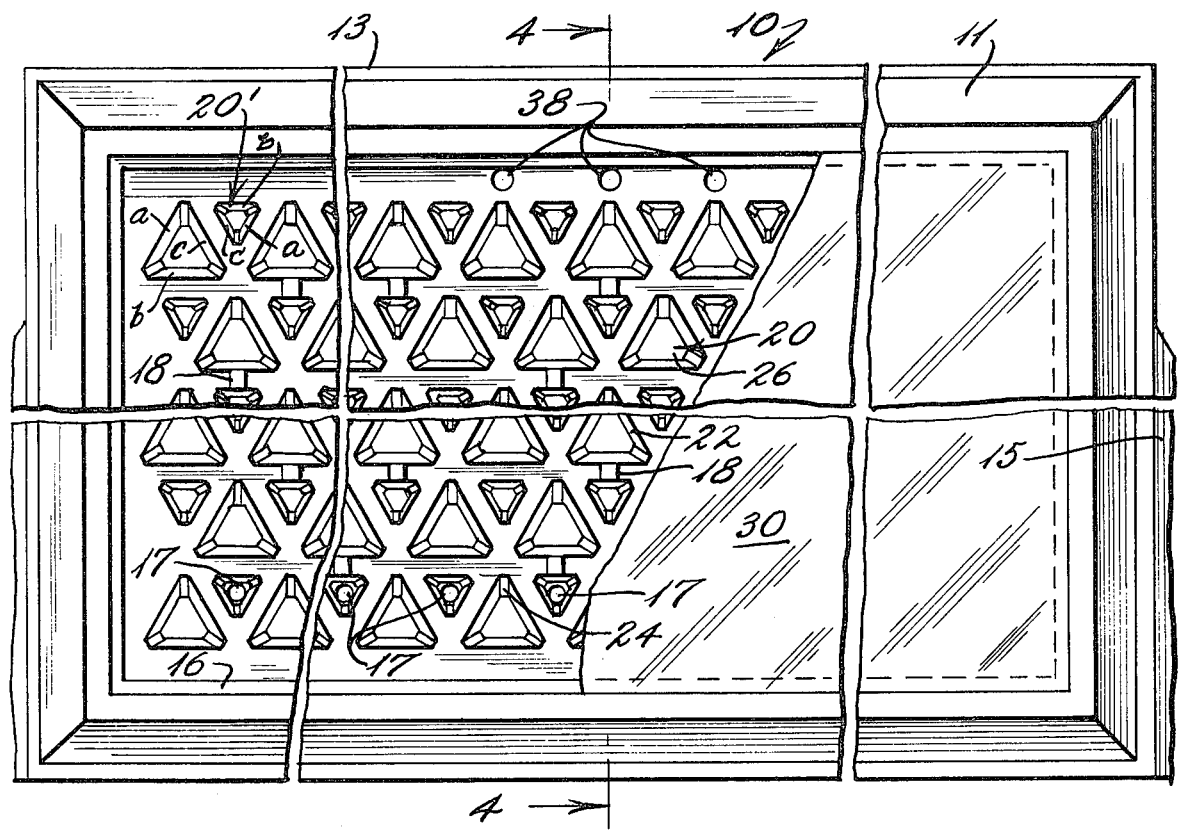
FIG. 2 is a front view of the device of FIG. 1, with the glazing partially cut away to show the exposed surface of the pocketed collector panel.
Figure 3:
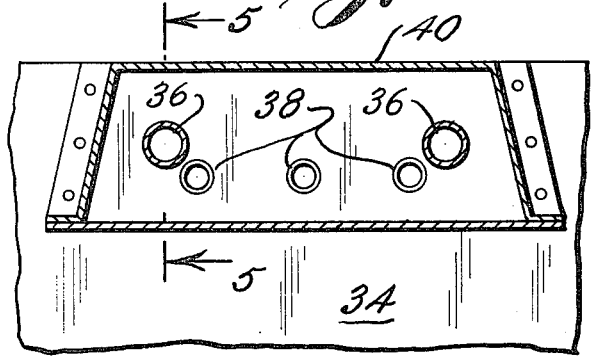
FIG. 3 is a sectional view along the lines 3—3 of FIG. 1.

FIGS. 1 and 2 depict the overall structure of the energy collector. The side of the solar collector that is exposed to the sun is shown in FIG. 2. Referring to FIG. 2, the basic collector panel 10 includes a plurality of molded, plastic, truncated tetrahedral pockets 20 interspersed with smaller pockets 20' of the same general structure. As may be seen in FIG. 6, each of these pockets 20 and 20' are generally tetrahedral-shaped recesses. These modified tetrahedral pockets 20 and 20' include faces 22, quasi-faces (truncated edges of a tetrahedron) 24 and a base (truncated vertex of a tetrahedron) 26 opening toward the exposed surface 12, with the bottom side of each pocket protruding outwardly from the unexposed surface 14 of the panel 10. As may be seen from FIGS. 4 and 6 pockets 20 and 20' are substantially similar in shape, with pocket 20' being smaller than pocket 20 in all dimensions. For purposes of describing the relative orientations of the pockets of panel 10, pocket 20 may be considered as rotated 180 degrees about a normal to exposed surface 12 and relative to pocket 20', such that face 20A corresponds to face 20'A of substantially similar pocket 20'. Likewise, faces 20B and 20C correspond respectively to faces 20'B and 20'C. Although the structural stength of the panel is increased when more of the pockets are of the same depth (to provide an increased number of support points for back cover 34), the interspersing of pockets 20 and 20' has been found to provided adequate structural support while, at the same time, limiting the points of contact of the collector panel 10 and back cover 34 to decrease heat loss. Additionally, with pockets 21' of smaller depth, less of an obstruction to airflow is presented.

Figure 4:
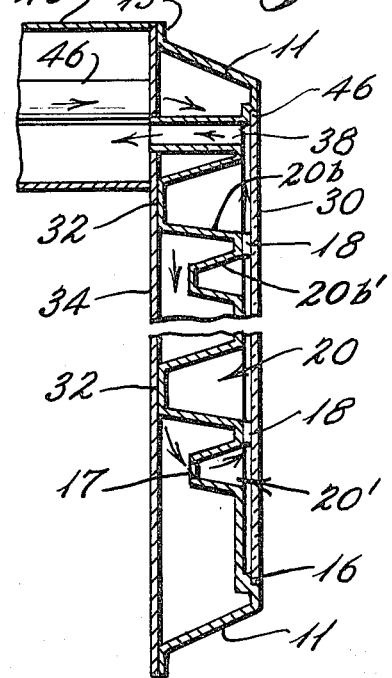
FIG. 4 is a fragmentary sectional view along the lines 4—4 of FIG. 2.

Referring to FIGS. 2 and 4, a transparent or translucent glazing 30 is mounted in an integrally molded inset step 16 of panel 10. Various spacers 18 are attached to the exposed surface 12 of panel 10 and engage the inside of glazing 30 for support, while allowing spacing of glazing 30 from exposed surface 12.

Panel 10 also includes sides 11 and the flanges 13 assisting in the support and positioning of a back cover 34. Additionally, flanges 13 are extended further toward the rear as at 15 for mounting or spacing purposes with respect to the side of a building or the like.

Figure 5:
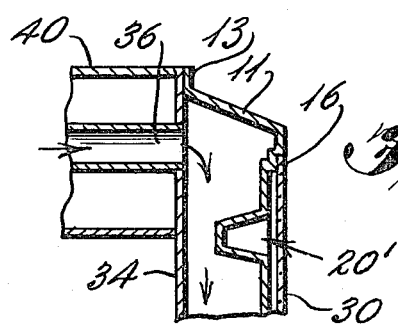
FIG. 5 is a partial sectional view along the lines 5—5 of FIG. 3.

Referring to FIGS. 4 and 5, back cover 34 includes inlet ports 36 and outlet ports 38, and crossover holes 17 are located in the base of the bottom row of small pockets 20' of the collector panel 10. Of course, these crossover holes 17 could be located elsewhere in the panel, such as through the faces or quasi-faces of the large or small pockets.

Also referring to FIG. 4, it may be seen that the back cover 34 is attachable to the bases of the larger pockets 20, as at 32, to lend overall structural support and integrity to the collector.

Additionally, the solar collector includes a means of circulation of the active medium (such as air). This embodiment of the invention discloses a ventilation receptable 40 attached to the back cover 34 of the collector, and includes an exhaust fan 42, air intake ports 44, and tubing (such as that indicated as 46 in FIG. 4) to connect the exhaust 42 or the intakes 44 to their respective outlets ports 38 and inlets ports 36. Of course, exhaust 42 and intakes 44 may be arranged in a different configuration and may include adjustable louvers in order to segregate and direct the air flow. The advantage of a ventilation receptacle 40 is that the collector may be positioned on the outside of a building while having the collector receptacle 40 extend through a window opening or the like to the interior of the building, thus providing a ventilation interconnection between the exterior and interior of the building as well as a means of support for the collector.

As indicated by the airflow arrows (seen in FIGS. 1, and 5), air is sucked into intakes 44 and inlet ports 36 to flow downwardly between back cover 34 and the unexposed surface 14 of the collector panel 10. The smaller pockets 20' obviously enhance airflow across the unexposed surface 14 of panel 10. Near the bottom of panel 10, crossover holes 17 allow the air to circulate through panel 10 to the space between the exposed surface 12 of panel 10 and the glazing 30. As stated earlier, various spacers 18 aid in the support and spacing of glazing 30 from exposed surface 12. Having circulated through crossover holes 17, the air then passes over the exposed surface 12 as it circulates to the outlet ports 38 and the exhaust fan 42.

Of course, means of circulation other than a fan including naturally occurring thermal convection, could be utilized with the solar collector. In addition, a thermostat control could be incorporated into the device.

The exposed surface 12 of panel 10 may be coated with a black matte finish to enhance absorption of the heat from the sun. In addition, the glazing 30 may be tinted as deemed appropriate for use. Back cover 34 could be insulated; however, it is preferable that sides 11 have a black matte finish and are not insulated—thereby increasing the collection of incident solar energy.

Thus it will be seen that the objects set forth above, among those made apparent from the preceding description, are efficiently attained and, since certain changes may be made in the construction set forth without departing from the scope of the invention, it is intended that all matter contained in the above description and as shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A solar energy collector having a front, a back, and sides, and comprising:
    a thin-walled energy collector panel comprising plural alternately interspersed small and large generally tetrahedronal-shaped collector pockets formed therein, an exposed surface facing said front and exposable to the sun and an unexposed surface facing said back, each of said pockets opening toward said exposed surface and having a truncated closed base, and a substantially perpendicular depth from said exposable surface to said base, the depth of said small pockets being less than the depth of said large pockets;

a glazing sealingly attached to and closing said front;

a back cover sealingly attached to and closing said back and engaged by at least some of said large pocket bases such that said large pockets provide internal structural support to said collector;

inlet means for entrance of air to and outlet means for exit of air from said collector; and circulation means for circulation of air along a flow path from said inlet means to said outlet means.

2. A solar energy collector as in claim 1 wherein at least a first and a second of said pockets open toward said exposed surface in a direction substantially normal to said exposed surface and are substantially similar in shape to provide corresponding faces and wherein said first pocket is oriented about said substantially normal direction relative to said second pocket such that at least one of said faces of said first pocket is not parallel to rays of the sun when the corresponding face of said second pocket is parallel to said rays of the sun.

3. An apparatus as in claim 1, wherein said circulation means includes an air pump.

4. A solar energy collector as in claim 3, wherein said circulation means further includes an attached ventilation receptacle extendable through a building wall to support said apparatus and to provide air circulation between the interior of the building and the collector panel.

* * * * *